UNITED STATES PATENT OFFICE.

SANFORD MATHIS, OF MADISON, GEORGIA, ASSIGNOR OF TWO-THIRDS TO AUGUSTUS H. MALLORY AND ALONZO R. MALLORY, OF SAME PLACE.

REMEDY FOR DIPHTHERIA.

SPECIFICATION forming part of Letters Patent No. 276,257, dated April 24, 1883.

Application filed July 13, 1882. (No specimens.)

*To all whom it may concern:*

Be it known that I, SANFORD MATHIS, a citizen of the United States of America, residing at Madison, in the county of Morgan and State of Georgia, have invented certain new and useful Improvements in Compounds for the Treatment of Diphtheria and Sore Throat, of which the following is a specification.

This invention relates to medicinal compounds for the treatment of diphtheria and other affections of the throat; and it consists in a certain composition of ingredients, as hereinafter described and claimed.

In carrying my invention into effect I first take any suitable vessel and place therein five gallons of water. I then place therein six pounds of red-oak bark, six pounds of white-oak bark, one pound of white sumac berries, and one pound of alum-root. I then boil the water containing the above ingredients for from two to two and a half hours, or until the liquid is reduced to two and a half gallons. The decoction is then strained, and to every pint of the strained liquid I add two and one-half table-spoonfuls of burnt alum, two and one-half table-spoonfuls of chlorate of potash, and one and one-half table-spoonful of flowers of sulphur. These latter ingredients having been duly combined with the decoction previously described, the compound is ready for use.

In the case of adults or children capable of gargling, the method found most efficacious for using this compound is to gargle the throat with the mixture while in a warm state some two or three times a day. In very obstinate cases it may sometimes be necessary to use the gargle more frequently; but usually it has been found that the use of the compound for the number of times above set forth is sufficient to neutralize the growth of the fungus and cause it to speedily become dislodged. Its continued use also is found to aid materially in healing the affected parts. Where, as sometimes happens in the case of young children and persons of maturer years, the process of gargling cannot easily be performed, the mixture may be applied to the affected parts by means of a mop formed of some suitable soft material, which is steeped in the mixture and then inserted within the throat.

This mixture has been found very efficacious in the treatment of all kinds of sore throat.

I am aware that a mixture composed of sumac-berries, white-oak bark, red-elm bark, blackberry-root, alum, and water, has been employed in the treatment of diphtheria; and I am also aware that chlorate of potash and sulphur are used locally in this disease, and such I do not claim; but I am not aware that any mixture has been prepared before my invention thereof in which either alum-root or vegetable alum or red-oak bark have been incorporated. These ingredients possess great neutralizing and healing qualities, and render the compound herein described very efficacious.

Having thus described my invention, what I claim therein is—

The compound herein described for the treatment of diphtheria and sore throat, consisting of red-oak bark, white-oak bark, white-sumac berries, alum-root, water, burnt alum, chlorate of potash, and sulphur, in about the proportions specified.

his
SANFORD × MATHIS.
mark.

Witnesses:
W. H. COCROFT,
C. K. COCROFT.